(12) United States Patent
Aronstam

(10) Patent No.: US 6,995,899 B2
(45) Date of Patent: Feb. 7, 2006

(54) FIBER OPTIC AMPLIFIER FOR OILFIELD APPLICATIONS

(75) Inventor: Peter S. Aronstam, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 292 days.

(21) Appl. No.: 10/600,478

(22) Filed: Jun. 20, 2003

(65) Prior Publication Data

US 2004/0109228 A1    Jun. 10, 2004

Related U.S. Application Data

(60) Provisional application No. 60/392,697, filed on Jun. 27, 2002.

(51) Int. Cl.
- H01S 3/00 (2006.01)
- H04B 10/12 (2006.01)
- H04B 13/02 (2006.01)

(52) U.S. Cl. .................... 359/333; 359/341.2; 398/104
(58) Field of Classification Search ............ 359/341.2, 359/333; 398/104, 105
See application file for complete search history.

(56) References Cited

U.S. PATENT DOCUMENTS

| | | | |
|---|---|---|---|
| 5,191,458 A | 3/1993 | Lyons et al. | |
| 5,321,707 A | 6/1994 | Huber | |
| 5,321,708 A | 6/1994 | Tohmon et al. | |
| 5,517,024 A | 5/1996 | Mullins et al. | |
| 5,784,505 A | 7/1998 | Schunk | |
| 5,801,878 A * | 9/1998 | Bourret et al. | 359/341.33 |
| 6,181,466 B1 * | 1/2001 | Franzoso et al. | 359/341.3 |
| 6,208,457 B1 | 3/2001 | Okuta et al. | |
| 6,281,489 B1 | 8/2001 | Tubel et al. | |
| 6,292,292 B1 | 9/2001 | Garito et al. | |
| 6,365,891 B1 * | 4/2002 | Hodgson et al. | 250/227.14 |
| 6,396,624 B1 | 5/2002 | Nissov et al. | |
| 6,459,846 B1 | 10/2002 | Choi et al. | |
| 6,507,679 B1 | 1/2003 | Hodgson et al. | |
| 2003/0011878 A1 | 1/2003 | Maas | |

FOREIGN PATENT DOCUMENTS

GB    2 281 463 A    3/1995

OTHER PUBLICATIONS

"Ebrium Doped-Fiber Amplifiers (EDFAs)", http://www.lightreading.com, (Aug. 1, 2001) [retrieved Dec. 19, 2001], 4 pages.

"Raman Applification", http://www.lightreading.com, (Aug. 1, 2001) [retrieved Dec. 19, 2001], 4 pages.

(Continued)

*Primary Examiner*—Mark Hellner
(74) *Attorney, Agent, or Firm*—Madan, Mossman & Sriram, P.C.

(57) ABSTRACT

A system of transmitting optical signals during a subsea oilfield operations comprises a subsea fiber optical signal carrier. The fiber optical signal carrier includes a first optical fiber having a least one doped section that acts as an amplifier to optical signals passing there through when the doped section is supplied with optical energy. A second optical fiber is disposed alongside the first optical fiber for carrying optical energy. An optical coupler between the second optical fiber and the at least one doped section supplies optical energy from the second optical fiber to the first optical fiber. At least one sensor provides optical signals to the first optical fiber. An optical energy source supplies optical energy to the second optical fiber.

25 Claims, 4 Drawing Sheets

OTHER PUBLICATIONS

Semiconductor Optical Amplifiers (SOAs), http://www.lightreading.com, (Aug. 1, 2001) [retrieved Dec. 19, 2001] 2 pages.

"Erbium Doped Fiber Amplifiers", Product showcase, Product release, Fiber Optics Online, http://www.fiberoptics.com, [retrieved Dec. 19, 2001].

* cited by examiner

FIBER OPTIC AMPLIFIER FOR OILFIELD APPLICATIONS

CROSS-REFERENCE TO RELATED APPLICATIONS

This application claims the benefit of U.S. Provisional Application No. 60/392,697, filed Jun. 27, 2002.

STATEMENT REGARDING FEDERALLY SPONSORED RESEARCH OR DEVELOPMENT

Not applicable

BACKGROUND OF THE INVENTION

1. Field of the Invention

This invention relates generally to oilfield operations and more particularly to an in-line fiber optic amplifier for use with sensors monitoring the condition of downhole equipment, monitoring certain geological conditions, reservoir monitoring and remedial operations.

2. Description of the Related Art

A variety of techniques have been utilized for monitoring wellbores during completion and production of wellbores, reservoir conditions, estimating quantities of hydrocarbons (oil and gas), operating downhole devices in the wellbores, and determining the physical condition of the wellbore and downhole devices.

Reservoir monitoring typically involves determining certain downhole parameters in producing wellbores at various locations in one or more producing wellbores in a field, typically over extended time periods. Wireline tools are most commonly utilized to obtain such measurements, which involves transporting the wireline tools to the wellsite, conveying the tools into the wellbores, shutting down the production and making measurements over extended periods of time and processing the resultant data at the surface. Seismic methods wherein a plurality of sensors are placed on the earth's surface and a source placed at the surface or downhole are utilized to provide maps of subsurface structure. Such information is used to update prior seismic maps to monitor the reservoir or field conditions. Updating existing 3-D seismic maps over time is referred to in industry as "4-D Seismic". The above described methods are very expensive. The wireline methods are utilized at relatively large time intervals, thereby not providing continuous information about the wellbore condition or that of the surrounding formations.

Placement of permanent sensors in the wellbore, such as temperature sensors, pressure sensors, accelerometers and hydrophones has been proposed to obtain continuous wellbore and formation information. A separate sensor is utilized for each type of parameter to be determined. To obtain such measurements from the entire useful segments of each wellbore, which may have multi-lateral wellbores, requires using a large number of sensors, which requires a large amount of power, data acquisition equipment and relatively large space in the wellbore: this may be impractical or prohibitively expensive.

Once the information has been obtained, it is desirable to manipulate downhole devices such as completion and production strings. Prior art methods for performing such functions commonly rely on the use of electrically operated devices with signals for their operation communicated through electrical cables. Because of the harsh operating conditions downhole, electrical cables are subject to degradation. In addition, due to long electrical path lengths for downhole devices, cable resistance becomes significant unless large cables are used. This is difficult to do within the limited space available in production strings. In addition, due to the high resistance, power requirements also become large.

In production wells, chemicals are often injected downhole to treat the producing fluids. However, it can be difficult to monitor and control such chemical injection in real time. Similarly, chemicals are typically used at the surface to treat the produced hydrocarbons (i.e., to break down emulsions) and to inhibit corrosion. However, it can be difficult to monitor and control such treatment in real time.

Systems for using fiber optic sensors are known in the art. For example, see U.S. Pat. No. 6,281,489 to Tubel et al, assigned to the assignee of this application and incorporated herein by reference. Tubel et al provide apparatus and methods which utilize sensors (such as fiber optic sensors), to monitor downhole parameters and to perform a variety of functions. The sensors are used to measure parameters related to various downhole parameters of interest.

Present day sub-sea production systems can comprise multiple wells connected by flow conduits to a single processing station that can be sub-sea or at the surface. The wells may be separated from the processing station by tens of kilometers. The sensor and communications cables are typically run adjacent, or inside, such flow conduits to a central controller. Optical signals traveling along optical fibers in these cables experience attenuation over the long distances causing poor detection at the central control.

Optical amplifiers are commercially available for the telecommunications industry. These devices, known as erbium doped fiber amplifiers are powered by an electrically energized laser pumping diode to excite erbium ions doped in a small section of the optical fiber to an energized state. An incoming signal causes the excited ions to drop to a lower energy state and emit photons. The pumping diode and associated electronics are connected to optical fiber in the vicinity of the erbium doped section. These commercially available devices are not well suited for the oilfield environment due to their size and the need for electrical power, at the amplifier, to power the laser diode.

The methods and apparatus of the present invention overcome the foregoing disadvantages of the prior art by providing an optical amplifier that requires no electrical energy at the amplifier and is suitable for use in an oilfield environment.

SUMMARY OF THE INVENTION

In one aspect of the present invention, a fiber optic signal system comprises a first optical fiber having a plurality of spaced apart doped sections that have a material that amplifies optical signals passing therethrough when optical energy is supplied to each of the plurality of spaced apart doped sections. A second optical fiber is adjacent the first optical fiber and is optically coupled to each of the plurality of doped sections. The second optical fiber has optical energy pumped therethrough for supplying optical energy to each of the plurality of doped sections to amplify optical signals carried by the first optical fiber.

In another aspect of the present invention, a method of transmitting optical signals comprises providing a first optical fiber having a plurality of spaced apart sections doped with a material that acts as an optical amplifier upon supply of optical energy thereto. A second optical fiber is provided adjacent the first optical fiber. The second optical fiber is coupled to each of the plurality of spaced apart doped sections. Optical energy is pumped from a remote source through the second optical fiber to each of the plurality of doped sections in the first optical fiber to amplify optical signals passing through the first optical fiber.

In yet another aspect of the present invention, a system of transmitting optical signals during a subsea oilfield operations comprises a fiber optical signal carrier placed at least a certain distance under water. The fiber optical-signal carrier includes a first optical fiber having a least one doped section that acts as an amplifier to optical signals passing therethrough when the doped section is supplied with optical energy. A second optical fiber is disposed alongside the first optical fiber for carrying optical energy. An optical coupler between the second optical fiber and the at least one doped section supplies optical energy from the second optical fiber to the first optical fiber. At least one sensor provides optical signals to the first optical fiber. An optical energy source supplies optical energy to the second optical fiber.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

The present invention contemplates a fiber optic amplifier for boosting signal strength of optical signals on a long optical fiber.

Figure 1:
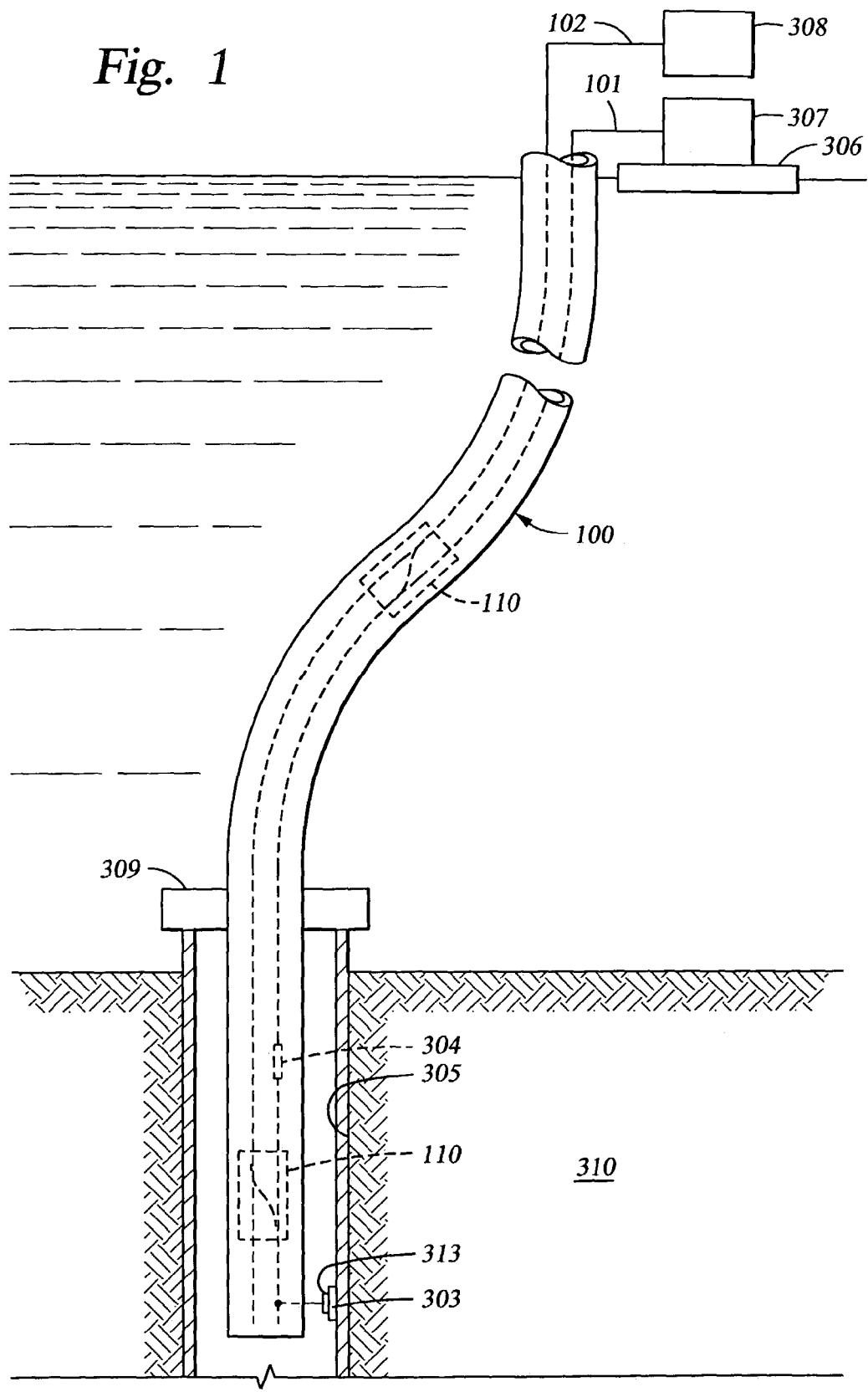
FIG. 1 is a schematic drawing of a fiber optic signal carrier according to one embodiment of the present invention.

According to one preferred embodiment, see FIG. 1, a cable 100 extends from a surface platform 306 through a sub-sea wellhead 309 into a wellbore 305 in a subterranean formation 310. The cable 100 comprises a signal optical fiber 101 and optical pumping fiber 102. The optical fibers 101 and 102 are positioned adjacent each other. Optical pump 308 is a light source for injecting light into optical pumping fiber 102. The cable 100 may contain other electrical or optical conductors. Signal fiber 101 is connected to sensor 303 in wellbore 305 through sensor interface 313. Sensor 303 detects a parameter of interest related to the flow of production fluid from formation 310. Sensor 303 may be one of (i) a temperature sensor; (ii) a pressure sensor; (iii) a flow measurement sensor; and (iv) a sensor providing a measure of a fluid characteristic. Such fluid characteristic sensors may be used to measure electrical and acoustic conductivity, density and to detect various light transmission and reflection phenomena. All of these sensor types are available commercially in various ranges and sensitivities which are selectable by one of ordinary skill in the art depending upon particular conditions known to exist in a particular well operation. Multiple sensors 303 may be located in the borehole 305 and optically coupled to signal fiber 101 through multiple sensor interfaces 313. Signal fiber 101 may also contain multiple sensors 304 distributed within signal fiber 101. See U.S. Pat. No. 6,281,489, incorporated herein by reference, for a more detailed description of such sensors. Sensors 304 may include (i) a temperature sensor; (ii) a pressure sensor; (iii) a flow measurement sensor; and (iv) a sensor providing a measure of a fluid characteristic. Sensors 304 are commonly formed in the signal fiber 101 during manufacture. A key issue regarding the use of fiber optic sensors in deep wells is the degradation of the optical signal strength over the required length of fiber. Fiber optic amplifiers 110 are suitably located in-line in cable 100 to boost the transmitted signal thereby providing suitable signal strength at surface receiver 307.

Figure 2:
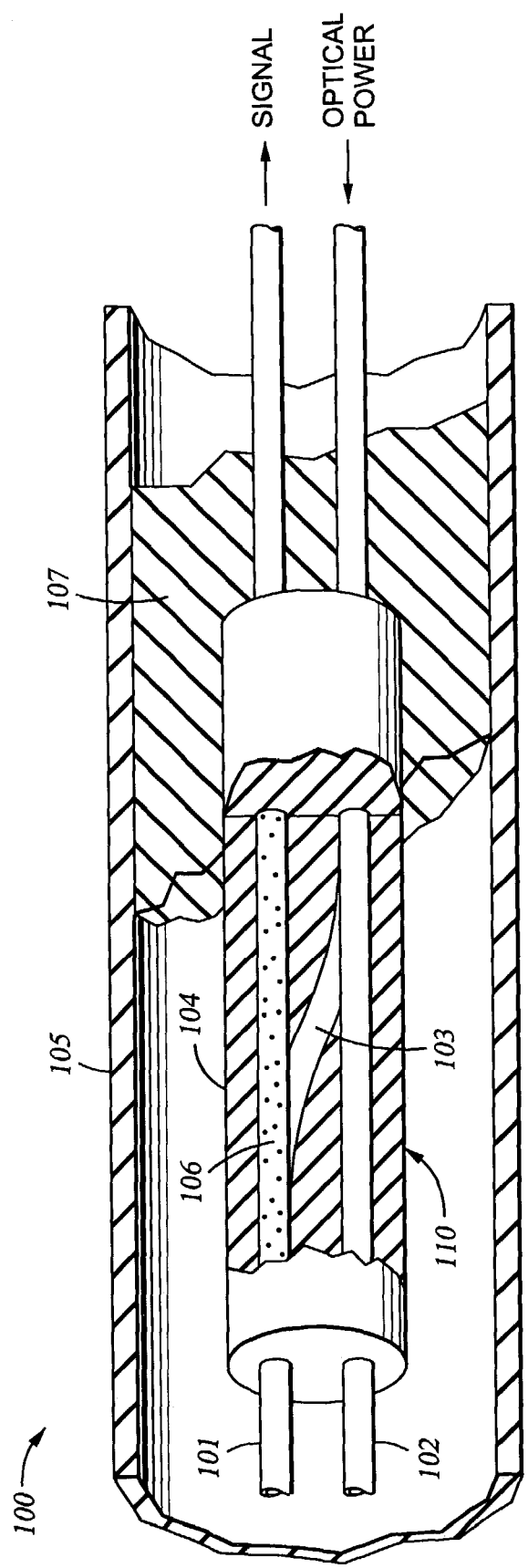
FIG. 2 is a schematic drawing of a two-fiber fiber optic amplifier according to one embodiment of the present invention.

FIG. 2 shows one preferred embodiment of fiber optic amplifier 110. As previously described, cable 1100 has a signal fiber 101 and an optical pumping fiber 102 encased in a protective cover 105. Protective cover 105 may be a tubing of a material including but not limited to (i) polyurethane (ii) steel; or (iii) a composite material. The signal fiber 101 transmits optical signals from downhole sensors 303 and 304 to the surface receiver 307, see FIG. 1. In long cables, optical attenuation in fiber 101 decreases the signal strength below acceptable levels. Optical amplifier 110 serves to boost the signals suitably above the background noise to enhance detection. Referring again to FIG. 2, a relatively short (on the order of a few meters) section of signal fiber 101 is doped with a rare-earth material such as erbium. Such doping techniques are known in the art. Optical pumping fiber 102 is optically coupled to signal fiber 101 using a commercially available optical coupler. The connected sections of fibers 101 and 102 are encapsulated using a suitable encapsulation material including, but not limited to, epoxy and silicone. The fibers 101, 102, and the encapsulated section may be further encapsulated within protective cover 105 by a common filler material 107 used in the cable art.

In operation, referring to FIGS. 1 and 2, optical power, which may be on the order of several watts, is injected into optical pumping fiber 102 by optical pump 308. Optical sources are commercially available for pumping up to tens of watts into such a fiber. The optical power is injected to the erbium doped section 106 of signal fiber 101 causing the erbium ions to be raised to an energized state. When an optical sensor signal passes through the doped section, the energized ions are stimulated to fall back to a ground energy state while simultaneously emitting photons that boost the optical sensor signal. The number of such optical amplifiers required is application dependent and is related to several factors including, but not limited to, initial sensor signal levels, background optical system noise, transmission distance, and receiver sensitivity. These factors may be analyzed using techniques common in the art to determine the number of fiber optic amplifiers for a given application and the total power to be pumped down pumping fiber 102.

Figure 3A:
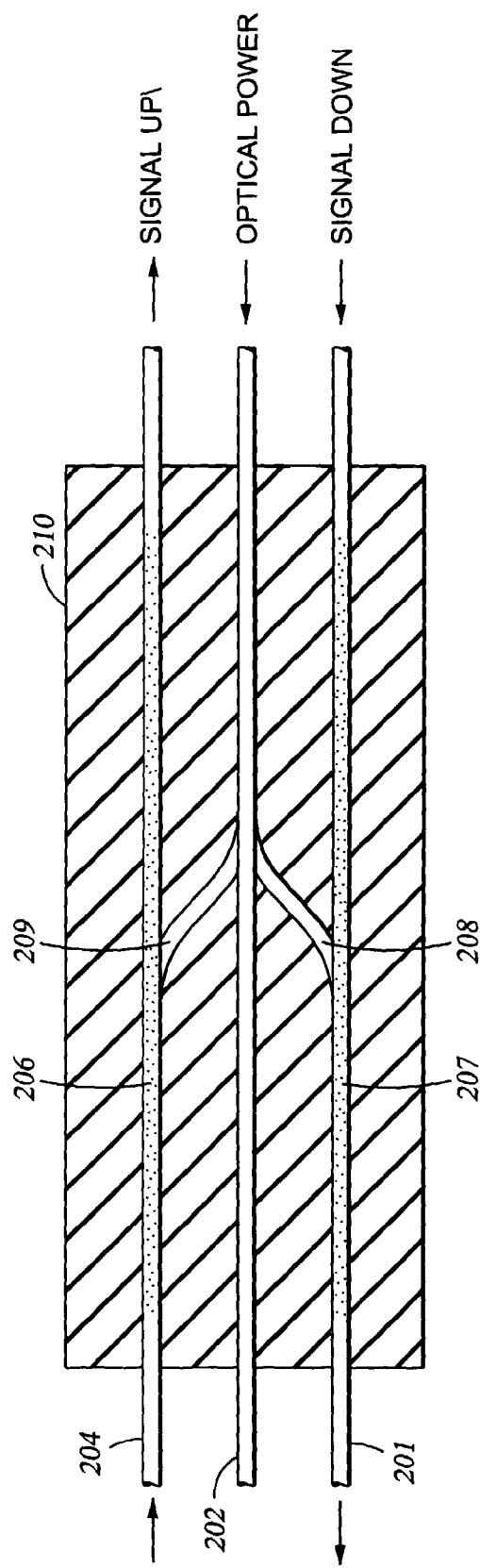
FIG. 3A is a schematic drawing of a three-fiber fiber optic amplifier according to one embodiment of the present invention.
Figure 3B:
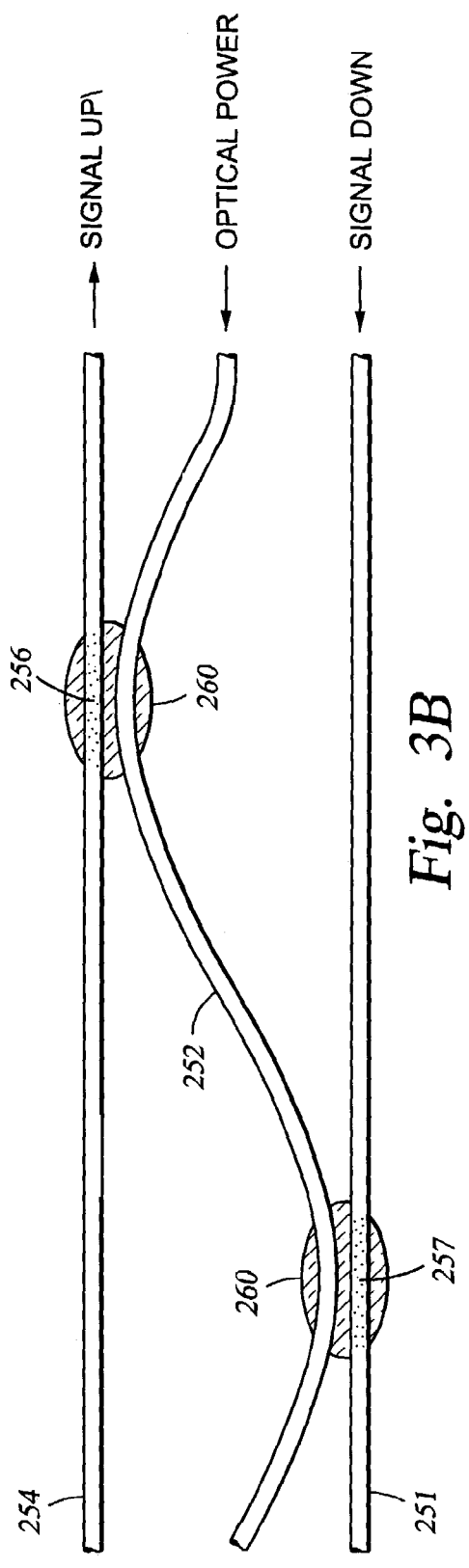
FIG. 3B is a schematic drawing of an alternative three-fiber fiber optic amplifier according to another preferred embodiment of the present invention.

In another preferred embodiment, FIG. 3A shows a single optical pumping fiber 202 used to energize two separate signal fibers 201 and 204. Pumping fiber 202 is coupled to signal fibers 201 and 204 by commercially available optical couplers 208 and 209. The pumping fiber 202 conveys suitable laser energy to the doped sections 207 and 206 of signal fibers 201 and 204 for amplifying signals traveling in fibers 201 and 204, as described previously. As shown in FIG. 3A, signal fibers 201 and 204 convey signals in opposite directions. Typical signals include, but are not limited to, sensor signals from a downhole location to a surface receiver/controller, and data command signals from a surface controller to a downhole sensor, such as sensor 303 of FIG. 1, for changing a sensor parameter. Typical sensor parameters include, but are not limited to, sampling frequency and sensor scaling. Alternatively, the data command signals may operate a production flow control device (not shown). While the pumping fiber 202 is shown being connected to two signal fibers 201 and 204, the number of signal fibers and doped sections that may be connected to a single pumping fiber is application dependent. Analytical techniques are available in the optical arts to determine the number of required amplification sections for each signal cable and optical pumping capacity of the pumping fiber. Alternatively, as shown in FIG. 3B, the optical pumping fiber 252 may be optically fused in optically transparent material 260 to signal fibers 254 and 251 at doped sections 256 and 257 respectively. As previously described, the number of doped sections and connections is application dependent.

It should be noted that all of the optical fiber embodiments disclosed may be contained in any of a number of cable types known in the art. These include, but are not limited to (i) electro-optical cables containing optical fibers and electrical conductors; (ii) electro-optical hydraulic cables carrying optical fibers, electrical conductors, and hydraulic hoses; and (iii) optical fiber cables. Any of these cables may be reinforced with braiding and encapsulation techniques common in the art. In addition, redundant signal fibers and pumping fibers may be included in such cables.

Figure 4:
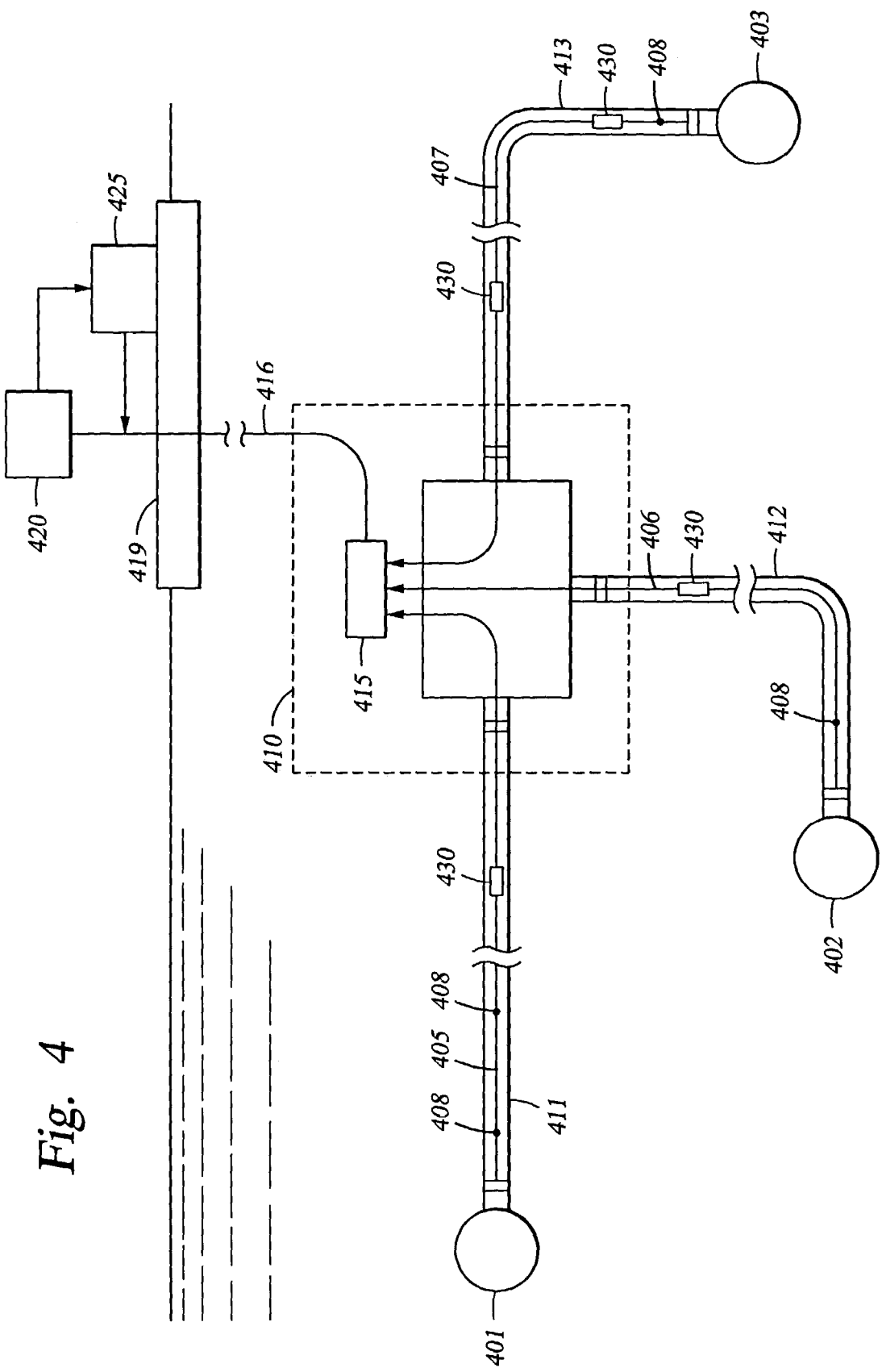
FIG. 4 is a schematic drawing of sub-sea production operation according to one embodiment of the present invention.

In one preferred embodiment, schematically shown in FIG. 4, a production system comprises sub-sea wells 401–403, drilled and completed in an offshore formation with production control equipment for each well located at the seafloor. The production flow from wells 401–403 are transferred through pipelines 411–413, respectively, to a common sub-sea processing unit 410. The processing unit 410 is controlled by sub-sea controller 415 that may contain circuitry (not shown) to operate flow control devices (not shown) for controlling flow from wells 401–403 based on instructions from a surface controller 420 located on production platform 419. Alternatively, for production systems that are connected by pipelines (not shown) to land based processing facilities, surface controller 420 may be land based. Umbilical cable 416 connects surface controller 420 with sub-sea controller 415. Umbilical cable 416 may contain electrical conductors and optical fibers suitable for signal transmission and for pumping optical energy as described herein. Combined electro-optical cables are known in the art and will not be described here further. It should be noted that wells 401–403 may be tens of kilometers from processing unit 410. In order to better control the flows from each of the wells 401–403, optical fiber cables 405–407 are disposed in pipelines 411–413 respectively. Each optical fiber cable 405–407 has fiber optic sensors 408 and fiber optic amplifiers 430 embedded in-line in each cable. The sensors 408 measure production parameters and may include, but are not limited to, (i) a temperature sensor; (ii) a pressure, sensor; (iii) a flow measurement sensor; and (iv) a sensor providing a measure of a fluid characteristic.

Fiber optic amplifiers 430 as previously described are disposed in the optical fiber cables 405–407 to amplify signals from sensors 407. In one preferred embodiment, signals from sensors 407 are transmitted along optical fiber cables 405–407 and are optically coupled at sub-sea controller 415 to optical signal fibers (not shown) in umbilical cable 416. The optical signals are received by an optical system (not shown) in surface controller 420. Surface controller 420 interprets the received signals according to programmed instructions and may initiate command signals to sub-sea controller 415 for controlling flow from wells 401–403. Surface located light source 425 provides optical power through optical pumping fibers (not shown) in the umbilical cable 416 that is then optically coupled to optical pumping fibers (not shown) in each of cables 405–407, thereby energizing each of optical amplifiers 430. The optical amplifiers 430 may be any combination of the single direction amplifier described with respect to FIG. 2 or the bi-directional amplifier described with respect to FIGS. 3A,B. Multiple optical amplifiers 430 may be used in a single optical fiber, as required. Multiple optical fiber systems may be contained in each cable. It should be noted that the use of three wells in the previous description is exemplary only as any number of sub-sea producing wells may be connected to processing unit 410 as described above.

In another preferred embodiment, optical amplifiers 430 may be used to amplify digital control and communication signals between surface and/or subsea controllers and production controllers (not shown) located in each of the production wells 401–403.

Systems and methods have been described in which at least one remotely powered, optical amplifier is used in oilfield applications to boost optical signals traveling along an optical fiber. Both sensor and communications signals may be boosted. The, optical fibers may be disposed in subsea wells and pipelines. Controllers at the surface and/or subsea may use the signals to control subsea production flows.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of transmitting optical signals in an oilfield operation, comprising:
    (a) providing a first optical fiber at least partially in a wellbore, the first optical fiber having a plurality of spaced apart sections doped with a material that acts as an optical amplifier upon supply of optical energy thereto;
    (b) providing a second optical fiber adjacent the first optical fiber and coupling the second optical fiber to each of the plurality of spaced apart doped sections; and
    (c) pumping optical energy from a remote source through said second optical fiber to each of said plurality of doped sections in said first optical fiber to amplify optical signals passing through said first optical fiber.

2. The method of claim 1 further comprising encapsulating each of the plurality of doped sections and the corresponding coupling between the first and the second optical fibers.

3. The method of claim 1 further comprising enclosing the first and the second fiber in a protective enclosure.

4. The method of claim 3 wherein the enclosure is a tubing.

5. The method of claim 4 wherein the tubing is one of a (i) polyurethane (ii) steel; or (iii) a composite material.

6. The method of claim 1 further comprising introducing optical signals to be transmitted into the first fiber.

7. The method of claim 1 further comprising coupling at least one sensor to the first optical fiber.

8. The method of claim 1 further comprising coupling a plurality of distributed optical sensors to the first fiber.

9. The method of claim 7 wherein said at least one sensor is selected from a group consisting of (i) a temperature sensor; (ii) a pressure sensor; (ii) a flow measurement sensor; (iv) a sensor for determining a chemical characteristic of a fluid; and (v) a sensor for determining a physical characteristic of a fluid.

10. A system of transmitting optical signals during an oilfield operation comprising:
  (a) a fiber optical signal carrier extending at least partially into a wellbore, said fiber optical signal carrier comprising:
    (i) a first optical fiber having at least one doped section that acts as an amplifier to optical signals passing there through when said doped section is supplied with optical energy;
    (ii) a second optical fiber disposed alongside the first optical fiber for carrying optical energy;
    (iii) an optical coupler between the second optical fiber and the at least one doped section for supplying optical energy from the second optical fiber to the first optical fiber;
  (b) at least one optical signal traveling in the first optical fiber; and
  (c) an optical energy source supplying optical energy to the second optical fiber.

11. The fiber optic signal carrier of claim 10 further comprising an enclosure enclosing the first and the second optical fibers.

12. The fiber optic signal carrier of claim 10 wherein the at least one doped section comprises a plurality of doped sections and each of the plurality of doped sections includes a separate optical coupling between the second optical fiber and each of said plurality of doped sections in said first optical fiber.

13. The fiber optic signal carrier of claim 12 wherein each of the plurality of doped sections and the corresponding optical coupling are encapsulated.

14. The fiber optic signal carrier of claim 10 further comprising a third optical fiber having a plurality of doped sections and placed alongside of the first and second optical fibers for carrying signals in a direction opposite of a direction of signals carried by the first optical fiber.

15. The fiber optic signal carrier of claim 14 further comprising an optical coupler between the second optical fiber and each of the plurality of doped sections of the third optical fiber.

16. The system of claim 10 wherein the optical energy source is located remotely from said doped section.

17. The system of claim 10 wherein the wellbore comprises subsea wellbore.

18. The system of claim 10 wherein the at least one optical signal is at least one of (i) a sensor signal and (ii) a communication signal.

19. The system of claim 18 wherein the sensor signal is generated from at least one sensor optically coupled to said first optical fiber.

20. The system of claim 19 wherein the sensor is one of (i) a pressure sensor; (ii) a temperature sensor; (iii) a flow measurement sensor; and (iv) a sensor providing a measure of a characteristic of a fluid.

21. A fiber optic signal carrier, comprising:
  a. a first optical fiber carrying a first optical signal in a first direction, said first optical fiber having a plurality of spaced apart first doped sections, said first doped sections having a material that amplifies optical signals passing therethrough upon supply of optical energy to said plurality of first doped sections;
  b. a second optical fiber adjacent said first optical fiber and carrying a second optical signal in a second direction, said second optical fiber having a plurality of spaced apart second doped sections, said second doped sections having a material that amplifies optical signals passing therethrough upon supply of optical energy to said plurality of second doped sections; and
  c. an optical pumping fiber adjacent said first optical fiber and said second optical fiber, said optical pumping fiber optically coupled to each of said plurality of first doped sections and second doped sections for supplying optical power to said doped sections thereby amplifying said first optical signal and said second optical signal.

22. A system of transmitting optical signals during a piping operation comprising:
  a. a fiber optical signal carrier extending at least partially into a pipeline carrying fluids, said fiber optical signal carrier comprising:
    (i) a first optical fiber having a least one doped section that acts as an amplifier to optical signals passing there through when said doped section is supplied with optical energy;
    (ii) a second optical fiber disposed alongside the first optical fiber for carrying optical energy;
    (iii) an optical coupler between the second optical fiber and the at least one doped section for supplying optical energy from the second optical fiber to the first optical fiber;
  b. at least one optical signal traveling in the first optical fiber; and
  c. an optical energy source supplying optical energy to the second optical fiber.

23. The method of claim 1, wherein the wellbore comprises a subsea wellbore.

24. A method of transmitting optical signals in a piping operation, comprising:
  a. providing a first optical fiber at least partially in a pipeline, the first optical fiber having a plurality of spaced apart sections doped with a material that acts as an optical amplifier upon supply of optical energy thereto;
  b. providing a second optical fiber adjacent the first optical fiber and coupling the second optical fiber to each of the plurality of spaced apart doped sections; and
  c. pumping optical energy from a remote source trough said second optical fiber to each of said plurality of doped sections in said first optical fiber to amplify optical signals passing through said first optical fiber.

25. The method of claim 24, wherein the pipeline comprises a subsea pipeline.

* * * * *